(12) United States Patent
Greisen et al.

(10) Patent No.: US 9,215,440 B2
(45) Date of Patent: Dec. 15, 2015

(54) EFFICIENT EWA VIDEO RENDERING

(71) Applicant: Disney Enterprises, Inc., Burbank, CA (US)

(72) Inventors: Pierre Greisen, Zurich (CH); Simon Heinzle, Zurich (CH); Michael Schaffner, Zumikon (CH); Aljosa Aleksej Andrej Smolic, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 492 days.

(21) Appl. No.: 13/654,350

(22) Filed: Oct. 17, 2012

(65) Prior Publication Data

US 2014/0104380 A1    Apr. 17, 2014

(51) Int. Cl.
*H04N 13/00* (2006.01)

(52) U.S. Cl.
CPC ....... *H04N 13/0022* (2013.01); *H04N 13/0007* (2013.01)

(58) Field of Classification Search
CPC ... H04N 13/007; H04N 13/0022; G06K 7/1469
USPC ............................................. 348/42; 345/427
See application file for complete search history.

(56) References Cited

U.S. PATENT DOCUMENTS

| | | | | |
|---|---|---|---|---|
| 5,870,097 | A * | 2/1999 | Snyder et al. | 345/426 |
| 6,249,616 | B1 * | 6/2001 | Hashimoto | 382/284 |
| 6,271,847 | B1 * | 8/2001 | Shum et al. | 345/418 |
| 8,428,343 | B2 * | 4/2013 | Hyung et al. | 382/154 |
| 2003/0016218 | A1 * | 1/2003 | Zwicker et al. | 345/424 |
| 2004/0012603 | A1 * | 1/2004 | Pfister et al. | 345/582 |
| 2006/0232598 | A1 * | 10/2006 | Barenbrug et al. | 345/582 |
| 2013/0028538 | A1 * | 1/2013 | Simske et al. | 382/300 |

OTHER PUBLICATIONS

Zwicker ("EWA Splatting" IEEE Transactions on Visualization and Computer Graphics, Jul.-Sep. 2002, vol. 8, No. 3 p. 223-237).*
Krahenbuhl ("A system for retargeting of Streaming video" ACM Transaction on Graphics, Publication date: Dec. 2009, vol. 28, No. 5 Article 126, Publication 2009 p. 126:1-126:10).*
Smolic, "3D Video and Free Viewpoint Video—From Capture to Display" Elsevier, Pattern Recognition 44 (2011), pp. 1958-1968.
H. Schwarz, D. Marpe, and T. Wiegand, "Overview of the scalable video coding extension of the H.264/AVC standard," Circuits and Systems for Video Technology, IEEE Transactions on, vol. 17, No. 9, pp. 1103-1120, 2007.
P. Krähenbühl, M. Lang, A. Hornung, and M. Gross, "A system for retargeting of streaming video," ACM Trans. Graph., vol. 28, No. 5, pp. 126:1-126:10, 2009.

(Continued)

*Primary Examiner* — Jamie Atala
*Assistant Examiner* — Masum Billah
(74) *Attorney, Agent, or Firm* — Patterson + Sheridan, LLP

(57) ABSTRACT

Techniques are disclosed for rendering images. The techniques include receiving an input image associated with a source space, the input image comprising a plurality of source pixels, and applying an adaptive transformation to a source pixel, where the adaptive transformation maps the source pixel to a target space associated with an output image comprising a plurality of target pixels. The techniques further include determining a target pixel affected by the source pixel based on the adaptive transformation. The techniques further include writing the transformed source pixel into a location in the output image associated with the target pixel.

20 Claims, 6 Drawing Sheets

(56) References Cited

OTHER PUBLICATIONS

3Smolic, P. Kauff, S. Knorr, A. Hornung, M. Kunter, M. Mueller, and M. Lang, "Three-dimensional video postproduction and processing," Proceedings of the IEEE, vol. 99, No. 4, pp. 607-625, 2011.

M. Lang, A. Hornung, O. Wang, S. Poulakos, A. Smolic, and M. Gross, "Nonlinear disparity mapping for stereoscopic 3D," ACM Trans. Graph., vol. 29, No. 4, pp. 75:1-75:10, 2010.

5C.-H. Chang, C.-K. Liang, and Y.-Y. Chuang, "Content-aware display adaptation and interactive editing for stereoscopic images," Multimedia, IEEE Transactions on, vol. 13, No. 4, pp. 589-601, 2011.

M. Farre, O. Wang, M. Lang, N. Stefanoski, A. Hornung, and A. Smolic, "Automatic content creation for multiview autostereoscopic displays using image domain warping," in Multimedia and Expo (ICME), 2011 IEEE International Conference on, 2011.

M. Tanimoto, M. Tehrani, T. Fujii, and T. Yendo, "Free-viewpoint TV," Signal Processing Magazine, IEEE, vol. 28, No. 1, pp. 67-76, 2011.

M. Do, Q. Nguyen, H. Nguyen, D. Kubacki, and S. Patel, "Immersive visual communication," Signal Processing Magazine, IEEE, vol. 28, No. 1, pp. 58-66, 2011.

T. Weyrich, S. Heinzle, T. Aila, D. Fasnacht, S. Oetiker, M. Botsch, C. Flaig, S. Mall, K. Rohrer, N. Felber et al., "A hardware architecture for surface splatting," ACM Trans. Graph., vol. 26, No. 3, pp. 23:1-23:9, 2007.

S. Heinzle, G. Guennebaud, M. Botsch, and M. Gross, "A hardware processing unit for point sets," in Proceedings of the 23rd ACM SIGGRAPH/Eurographics symposium on Graphics hardware. Eurographics Association, 2008, pp. 21-31.

P. Heckbert, "Fundamentals of texture mapping and image warping," Masters Thesis, Univ. of California, Berkeley, Dept. of Electrical Eng. and Computer Science, 1989.

R. Szeliski, S. Winder, and M. Uyttendaele, "High-quality multi-pass image resampling," Microsoft Research, Tech. Rep., 2010.

B. Triggs, "Empirical filter estimation for subpixel interpolation and matching," in Computer Vision, 2001. ICCV 2001. IEEE 8th International Conference on, vol. 2, 2001, pp. 550-557.

R. Stasinski and J. Konrad, "Improved POCS-based image reconstruction from irregularly-spaced samples," in Proceedings of the XI European Signal Processing Conference, 2002, pp. 271-290.

Y.-R. Horng, Y.-C. Tseng, and T.-S. Chang, "VLSI architecture for realtime HD 1080p view synthesis engine," Circuits and Systems for Video Technology, IEEE Transactions on, vol. 21, No. 9, pp. 1329-1340, 2011.

M. Zwicker, H. Pfister, J. V. Baar, and M. Gross, "EWA splatting," Visualization and Computer Graphics, IEEE Transactions on, vol. 8, No. 3, pp. 223-238, 2002.

R. Bracewell, K.-Y. Chang, A. Jha, and Y.-H. Wang, "Affine theorem for two-dimensional fourier transform," Electronics Letters, vol. 29, No. 3, p. 304, 1993.

C. Sigg, T. Weyrich, M. Botsch, and M. Gross, "GPU-based raycasting of quadratic surfaces," in Eurographics Symposium on Point-Based Graphics, 2006, pp. 59-65.

C. Lomont, "Fast inverse square root," Purdue University, Tech. Rep., 2003. [Online]. Available: http://www.lomont.org/Math/Papers/2003/InvSqrt.pdf.

L. Wolf, M. Guttmann, and D. Cohen-Or, "Non-homogeneous content driven video-retargeting," in Computer Vision, 2007. ICCV 2007. IEEE 11th International Conference on, 2007.

P. Greisen, M. Schaffner, S. Heinzle, M. Runo, A. Smolic, A. Burg, H. Kaeslin, and M. Gross, "Analysis and VLSI Implementation of EWA Rendering for Real-time HD Video Applications," IEEE Transactions on Circuits and Systems for Video Technology, vol. 22, No. 11, pp. 1577-1589, 2012.

Chenlei Guo et al., Spatio-temporal Saliency Detection Using Phase Spectrum of Quaternion Fourier Transform.

Pierre Greisen, Michael Schaffner et al., Analysis and VLSI Implementation of EWA Rendering for Real-Time HD Video Applications.

Siddhartha Chatterjee, Sandeep Sen, Cache-Efficient Matrix Transposition.

Sungmin Bae, Yong Cheol Peter Cho, Sungho Park et al., An FPGA implementation of Information Theoretic Visual-Saliency System and Its Optimization.

Judd Ehinger Durand and Torralba, Learning to Predict Where Humans Look.

Jun-Seong Kim, Seong-Gyun Jeong et al, Content-Aware Image and Video Resizing Based on Frequency Domain Analysis.

Hendrik Knoche et al., The Kindest Cut: Enhancing the User Experience of MobileTV through Adequate Zooming.

Philipp Krahenbuhl Manuel Lang, A System for Retargeting of Streaming Video.

Rubenstein Gutierrez Sorkine and Shamir, A Comparative Study of Image Retargeting.

Rubenstein Shamir and Avidan, Improved Seam Carving for Video Retargeting.

Rubenstein Shamir and Avidan, Multi-operator Media Retargeting.

Setlur Takagi Raskar et al, Automatic Image Retargeting.

Liang Shi, Jingiao Wang, Ling-yu Duan, Hanqing Lu, Consumer Video Retargeting: Context Assisted Spatial-temporal Grid Optimization.

Wang Fu Sorkine et al, Motion-Aware Temporal Coherence for Video Resizing.

Lior Wolf, Moshe Guttmann, Daniel Cohen-Or, Non-homogeneous Content-driven Video-Retargeting.

Wang Lin Sorkine and Lee, Motion-based Video Retargeting with Optimized Crop-and-Warp.

Wang Stefanoski Land et al, Extending SVC by Content-Adaptive Spatial Scalability.

Wang Tai Sorkine and Lee, Optimized Scale-and-Stretch for Image Resizing.

Wang Hsiao Sorkine and Lee, Scalable and Coherent Video Resizing with Per-Frame Optimization.

Zhang Hu and Martin, Shrinkability Maps for Content-Aware Video Resizing.

Zwicker and Pfister, EWA Splatting.

Tilke Judd et al., Fixations on low-resolution images.

Lang et al. Practical Temporal Consistency for Image-Based Graphics Applications.

Daniele Panozzo et al. Robust Image Retargeting via Axis-Aligned Deformation.

Daniele Panozzo et al. Robust Image Retargeting via Axis-Aligned Deformation (Supplemental Material).

\* cited by examiner

EFFICIENT EWA VIDEO RENDERING

BACKGROUND OF THE INVENTION

1. Field of the Invention

The present invention relates generally to the field of video processing and, more specifically, to efficient EWA video rendering.

2. Description of the Related Art

Visual content is presented on a broad range of displays, from large scale cinema screens, consumer flat screen monitors, and personal computer screens to various types of mobile devices. Typically, one or more aspects of the visual content are changed in order to present the content in a form that is compatible with a particular display. Because picture element (pixel) resolution, aspect ratio, and frame rate of displays vary significantly, rendering visual content from a source format into a target format is practically performed at or near the display, rather than at or near the source of the visual content. In addition, various transformations are often added to visual content, such as image rotation, image size reduction or magnification, special effects such as water-rippling effects, and the like.

Various applications benefit from rendering video from the source format to the target format using a non-linear scaling technique. With non-linear scaling, certain portions of the visual content may be rendered using one scaling factor, while other portions of the visual content are rendered using other scaling factors. With content aware video retargeting from one aspect ratio to another, visually important regions of the content are scaled linearly to retain their original aspect ratio and to avoid distortion. Visually less important regions of the content are distorted more via non-linear scaling to accommodate the visually more important regions. With stereoscopic three-dimensional (S3D) viewing, the impression of depth may be increased or decreased by non-linearly scaling certain portions of the visual content more or less, relative to other portions. The degree of non-linear scaling could be controlled, for example, by a depth control associated with the display. With multi-viewer stereoscopic displays, multiple S3D signals are delivered to the display, where each S3D signal may be created using different non-linear scaling parameters. Each viewer may select one of the multiple S3D signals for viewing based on the viewer's distance and angle with respect to the display.

Scaling may be performed via any technically feasible approach known in the art, including, without limitation, interpolation techniques, such as bilinear interpolation, Lanczos interpolation, linear interpolation, and kernel splatting, and anti-aliasing techniques, such as super-sampling, mip-mapping, and kernel splatting. One such technique uses a non-linear scaling approach for interpolation and anti-aliasing called elliptical weighted average (EWA) rendering, which is also known as EWA splatting. EWA splatting implicitly handles anti-aliasing efficiently relative to at least some other techniques. However, current EWA splatting techniques suffer from over-blurring of the visual content, causing a reduced visual experience. In addition, EWA is computationally expensive, typically using special processing units such as graphics processing units (GPU). These special processing units may be costly, large in size, and have relatively high power requirements, making current EWA splatting techniques impractical for consumer displays such as flat screen monitors and mobile devices.

SUMMARY OF THE INVENTION

One embodiment of the present invention includes an approach for non-linear EWA splatting in display devices with improved quality and reduced computational complexity. Based on this approach, an efficient hardware architecture for consumer displays, such as flat screen monitors and mobile devices, may be implemented. Such a hardware architecture may be able to render high-definition (HD) video content, including S3D and multi-viewer content, in real time, with modest hardware cost and using low processor clock speeds.

One embodiment of the present invention includes a method for rendering an input image. The method includes receiving an input image associated with a source space, the input image comprising a plurality of source picture elements (pixels), and applying an adaptive transformation to a source pixel within the plurality of source pixels, where the adaptive transformation maps the source pixel to a target space associated with an output image comprising a plurality of target pixels. The method further includes determining a target pixel, of the plurality of target pixels, that is affected by the source pixel based on the adaptive transformation. The method further includes writing the transformed source pixel into a location in the output image associated with the target pixel.

Other embodiments include, without limitation, a computer-readable storage medium that includes instructions that enable a processing unit to implement one or more aspects of the disclosed methods as well as a computing system configured to implement one or more aspects of the disclosed methods.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention involve efficiently warping visual content from a source space to a target space based on a given mapping function resulting in a target image with reduced blurring as compared to prior EWA splatting techniques. As further described below, EWA splatting is optimized by choosing certain filter parameters and utilizing an adaptive anti-aliasing technique that determines an optimal tradeoff between blurring and aliasing. Cut-off points for the infinite impulse response (IIR) filters used in EWA rendering are selected in the rendered target space, providing acceptable filter quality with greater computational efficiency relative to ideal IIR filters. A hardware architecture is configured for real-time non-linear EWA rendering of high-resolution images with lower cost, lower power, and smaller integrated circuit size relative to prior techniques. A two-level caching architecture reduces memory bandwidth usage relative to prior techniques.

As is known in the art, EWA rendering or EWA splatting in target space is defined by the equation:

$$f_{EWA}(x) = \sum_{k \in D_s} w_k \frac{1}{|J_k^{-1}|} G_{J_k V_i J_k^T + V_a}(x - m(u_k)) \quad \text{Equation 1}$$

$$= \sum_{k \in D_s} \frac{w_k |J_k|}{2\pi |C|^{1/2}} e^{-1/2(x-m(u_k))^T C^{-1}(x-m(u_k))}$$

where $V_i$ is the Gaussian interpolation covariance matrix, $V_a$ is the anti-aliasing covariance matrix, and $C \equiv C_k = J_k V_i J_k^T + V_a$. Note that in Equation 1, the location index k of the EWA covariance matrix $C = J_k V_i J_k^T + V_a$ is omitted for ease of notation.

An overall system architecture is described below, followed by a description of optimizing Vi and Va. Selecting an appropriate bounding box to define cut-off points for the Gaussian ellipse is then described, followed by a description of a hardware architecture to implement the improved EWA splatting technique, according to one embodiment.

In one embodiment, rendering visual content from a source format to a target format is efficiently performed in real time with reduced blurring, even for video images at high definition (HD) resolution. As a result, visually pleasing EWA rendering of HD video is possible using less expensive and smaller components relative to current techniques.

Hardware Overview

Figure 1:
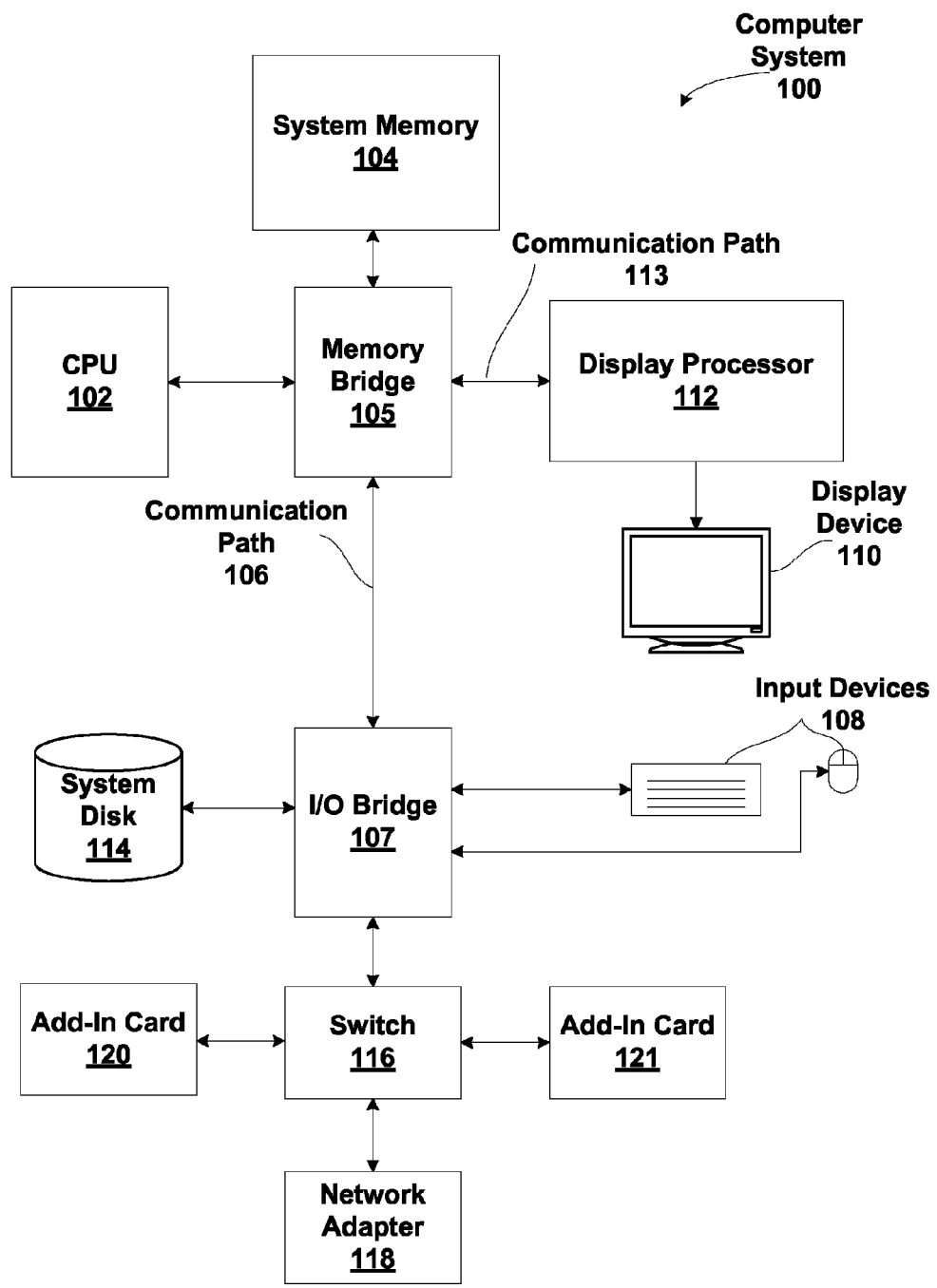
FIG. 1 depicts one architecture of a system, according to one embodiment of the present invention.

FIG. 1 depicts one architecture of a system 100, according to one embodiment of the present invention. This figure in no way limits or is intended to limit the scope of the present invention.

System 100 may be a personal computer, video game console, personal digital assistant, rendering engine, or any other device suitable for practicing one or more embodiments of the present invention.

As shown, system 100 includes a central processing unit (CPU) 102 and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and microphones) and forwards the input to CPU 102 via memory bridge 105.

A display processor 112 is coupled to memory bridge 105 via a bus or other communication path 113 (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and 110 bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and data representing a scene are provided to a render farm or a set of server computers, each similar to system 100, via network adapter 118 or system disk 114. The render farm generates one or more rendered images of the scene using the provided instructions and data. These rendered images may be stored on computer-readable media in a digital format and optionally returned to system 100 for display. Similarly, stereo image pairs processed by display processor 112 may be output to other systems for display, stored in system disk 114, or stored on computer-readable media in a digital format.

Alternatively, CPU 102 provides display processor 112 with data and instructions defining the desired output images, from which display processor 112 generates the pixel data of one or more output images, including characterizing and adjusting the offset between stereo image pairs. The data and instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and camera parameters for a scene. Display processor 112 can further include one or more programmable execution units capable of executing shader programs, tone mapping programs, and the like.

The CPU 102, render farm, or display processor 112 can employ any surface or volume rendering technique known in the art to create one or more rendered images from the provided data and instructions, including, without limitation, rasterization, scanline rendering REYES or micropolygon rendering, ray casting, ray tracing, image-based rendering techniques, and combinations of these and any other rendering or image processing techniques known in the art. In one embodiment, the display processor 112 includes an elliptical weighted average (EWA) video rendering system, as further described below, that is configured to receive an input image and render the input image into a target image using EWA rendering, also known as EWA splatting. The resulting target image may be transmitted by the EWA video rendering system to the display device 110.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Interpolation and Anti-Aliasing Parameterization

Figure 2:
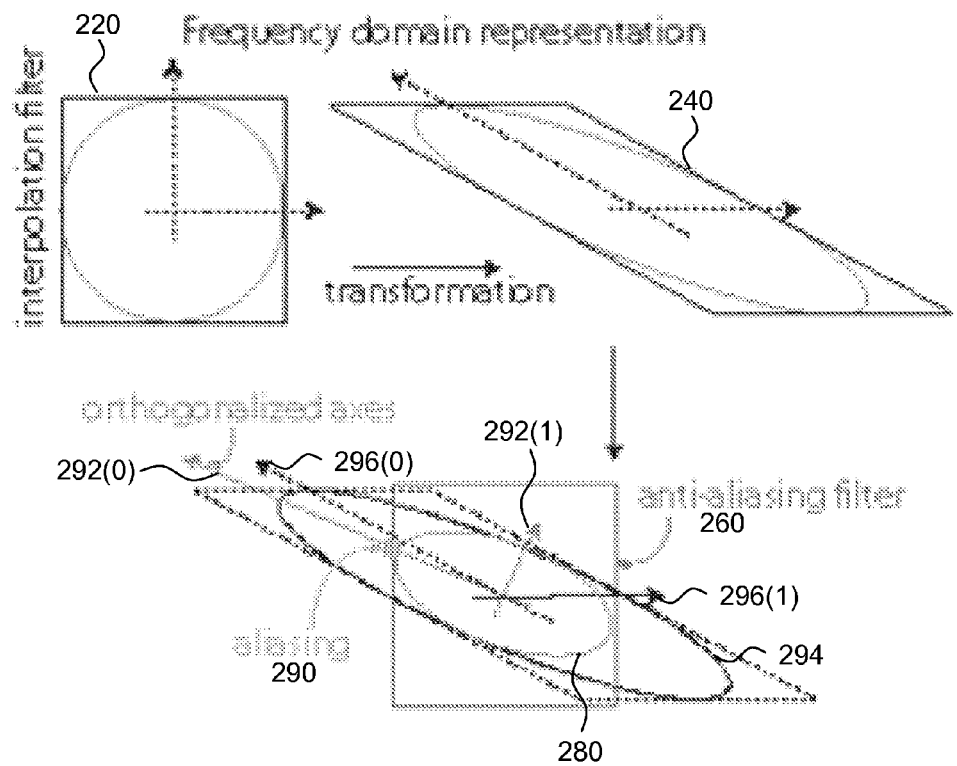
FIG. 2 illustrates various steps of the EWA splatting technique, according to one embodiment of the invention.

FIG. 2 illustrates various steps of the EWA splatting technique, according to one embodiment of the invention. As shown, and as further described below, a source space interpolation filter 220 is specified in the frequency domain and then a transformed version of the interpolation filter in the target space is shown in 240. The resulting target space interpolation filter 240 of the source space interpolation filter 220 is then convolved with an adaptive anti-aliasing filter 260 to form the final composite interpolation/anti-aliasing filter 280, where filter convolution involves combining two filters to achieve a third, modified filter representing the final composite result of the two individual filters. Note that this final composite interpolation/anti-aliasing filter also referred to herein as the adaptive transformation.

Performance of Gaussian filters, as used in EWA splatting, is dependent on the selected variance. A variance that is too large may introduce excessive blurring of the image while a variance that is too small may introduce aliasing. Selecting a variance representing an optimal balance between blurring and anti-aliasing may thus achieve improved image rendering quality. An optimal covariance matrix is first determined for the circular Gaussian interpolation filter in source space $f_{i,EWA}(x)=G_{V_i}(x)$. From this result, the optimal parameterization of the transformed interpolation kernel in target space $f_{i,EWA}(J_k^{-1}x)$ is determined. Likewise, the optimal interpolation Gaussian in target space is the one determined for the interpolation Gaussian in source space mapped by $J_k^{-1}$. However, because of the dependency of the optimal interpolation Gaussian in target space in the mapping ($J_k^{-1}$), the anti-aliasing covariance may be determined locally, thus, the resulting resampling filter may be locally adaptive. Therefore, determining an optimal parameterization of the anti-aliasing filter involves an adaptive anti-aliasing technique as further described below.

First, the interpolation covariance may be optimized in source space, according to one embodiment. To find an optimal balance between blurring and aliasing for the interpolation covariance matrix the mean squared error (MSE) between the EWA filter and an ideal low pass filter may be minimized. The ideal low-pass filter may be given as a two-dimensional (2D) sinc function $\theta_{i,ideal}(x)=sinc(x) sinc(y)$, which corresponds to a 2D rectangular function in frequency domain as given by the equation below:

$$\mathcal{F} f_{i,ideal}(x) \equiv \hat{f}_{i,ideal}(p) = \frac{1}{2\pi} rect_\pi(p) rect_\pi(q) \qquad \text{Equation 2}$$

where $p=(p,q)^T$ is a point in 2D angular frequency space, $\mathcal{F}$ is the Fourier transform operator, and $rect_\pi(p)=1$ if $|p|\leq\pi$, or $rect_\pi(p)=0$ otherwise.

The Fourier transform of the EWA interpolation filter in source space may be given by the following equation:

$$\hat{f}_{i,EWA}(p) = \frac{1}{2\pi}\exp\left(-\frac{\sigma_i^2(p^2+q^2)}{2}\right) \qquad \text{Equation 3}$$

where $V_i=\sigma_i^2 I_2$, and $\sigma_i^2$ is the interpolation variance. Notably, the optimal source space covariance matrix $V_i$ is isotropic, as the sampling in source space is assumed to be uniform.

The EWA kernel may be compared with the ideal sinc kernel by computing the MSE between these two kernels according to the equation below:

$$\begin{aligned} mse(\sigma_i) &= \|f_{i,ideal}(x) - f_{i,EWA}(x)\|2, \qquad \text{Equation 4}\\ &= \|\hat{f}_{i,ideal}(p) - \hat{f}_{i,EWA}(p)\|2, \\ &= \propto \left\|rect_\pi(p)rect_\pi(q) - \exp\left(-\frac{\sigma_i^2}{2(p^2+q^2)}\right)\right\|2, \\ &\propto 1 + \frac{1}{4\pi\sigma_i^2}\exp\left(1 - 4\cdot erf\left(\frac{\pi\sigma_i}{\sqrt{(2)}}\right)\right) \end{aligned}$$

where the first step follows directly from Parseval's theorem, and where erf(x) is the Gaussian error function. An optimal (least-squares) tradeoff between anti-aliasing and blurring may be obtained by choosing an interpolation variance $\sigma_i$ such that $mse(\sigma_i)$ is minimized. Numerical minimization of Equation 4 yields the following equation:

$$\hat{\sigma}_i = \text{argmin}_{\sigma_i}(mse(\sigma_i)) \approx 0.39 \qquad \text{Equation 5}$$

One skilled in the art would recognize that using the ideal sinc directly is not optimal in practice due to the ideal filter's slow decay (resulting higher compute complexity) and that truncating the ideal filter may lead to objectionable filter quality degradations in some cases (e.g., Gibbs oscillations).

Second, the interpolation covariance may be optimized in target space, according to one embodiment. To implement EWA splitting, target space parameterization of $f_{i,EWA}(J_k^{-1}x)$ is determined from the corresponding source space parameterization, as described above. Such a determination may be made using the following transformation property of Fourier transforms: if $\hat{f}(p)$ is the Fourier transform of $f(x)$, and if $A \in \mathbb{R}^{2\times 2}$ is an invertible matrix, then the Fourier transform operator may be given by the following equation:

$$\mathcal{F} f(Ax) = \frac{1}{|A|} \hat{f}(A^{-T}p) \qquad \text{Equation 6}$$

The MSE in target space may then be given by the following equation:

$$mse(\sigma_i) = \left\| \frac{1}{|J_k^{-1}|} \hat{f}_{i,ideal}(J_k^T p) - \hat{f}_{i,EWA}(J_k^T p) \right\|_2 \qquad \text{Equation 7}$$

Optimizing Equation 7 yields the same $\hat{\sigma}_i$ as determined for the source space optimization (set $p' = J_k^T p$). Thus, the transformation $J_k^T$ transforms the optimal source interpolation covariance to the optimal destination interpolation covariance.

Third, the interpolation filter described above may be convolved with an anti-aliasing filter, according to one embodiment. The EWA resampling operation is location-dependent, i.e., the EWA filter is a locally adaptive filter. Convolving the location dependent interpolation filter with an anti-aliasing filter results in a new EWA filter with a location-dependent covariance matrix. Thus, the choice of an optimal $V_a$ depends on the interpolation variance in target space: $J_k V_i J_k^T$. In other words, there is no single $V_a$ that optimizes the EWA splatting operation. For example, if the sum of $\sigma_i$ and $\sigma_a$ is set to $\hat{\sigma}_i$, filter performance may be acceptable in regions of the image where there is little or no scaling. However, regions of the image with a larger amount of scaling (e.g., significant reduction in size), may exhibit an unacceptable level of aliasing artifacts. Setting $\sigma_a$ to a larger value may introduce an unacceptable level of blurring in regions of the image experience a large amount of magnification. Therefore, $V_a$ is locally adaptive, and is determined so that its combined effect with the interpolation covariance, $J_k V_i J_k^T$, satisfies the Nyquist condition for preventing aliasing, as described below.

Adaptive Anti-Aliasing

A general closed form expression may be derived for the ideal adaptive anti-aliasing covariance matrix. Rather than using the MSE-based evaluation, as described above in conjunction with the interpolation kernel, the resampling operation may be analyzed in the frequency domain to derive the anti-aliasing covariance matrix. Aliasing may occur when the 2D frequency response of the transformed interpolation kernel $\mathcal{F} f_{i,EWA}(J_k^{-1}x)$ is greater than the 2D Nyquist frequency. Returning to FIG. 2, aliasing 290 may occur when the frequency content of the image exceeds the region delimited by the 2D rectangular function of the anti-aliasing filter 260. An adaptive anti-aliasing technique detects if such aliasing occurs at the intersection between the principal axes of the ellipse, 292(0) and 292(1), and the anti-aliasing filter 260, and locally adapts the non-isotropic anti-aliasing covariance matrix $V_a = \text{diag}([\sigma_{a,x}, \sigma_{a,x}])$ to avoid aliasing. In geometric terms, the corresponding principal ellipse axes are scaled to fit into the Nyquist rectangle. According to the principal axis theorem, the principal axes 292 of the ellipse 294 are the eigenvectors of the covariance matrix, for real symmetric matrices.

To quantify the presence of aliasing, the frequency response at the intersection of the principal axes of the transformed ellipse may be compared with the ideal anti-aliasing filter. Aliasing may occur if this frequency response value is large compared to the optimal Gaussian filter $\hat{\sigma}_i$. As shown in FIG. 2, after employing the transformation matrix $\tilde{C} = J_k V_i J_k^T$ the transformation axes 296 are not aligned anymore with the principal axes 292 of the target space Gaussian kernel. The principal axes 292 are obtained with an Eigen decomposition $\tilde{C} = Q \Lambda Q^T$, where $\Lambda$ includes the magnitudes of the principal axes, and Q includes the orthogonal directions of the principal axes.

Because only the intersection point of the axes with an ideal low-pass filter is needed, only the directions of the axes need to be determined. The direction of one of the axes is given by $\alpha = q_{1,2}/q_{1,1}$, where $q_{i,j}$ denotes the entry in row i and column j of matrix Q, and the direction of the other axis is given by $-\alpha^{-1}$, since the axes are orthogonal. Evaluating the decomposition yields the following equation:

$$\alpha = \frac{2\tilde{c}_{1,2}}{\tilde{c}_{1,1} - \tilde{c}_{2,2} - \sqrt{4\tilde{c}_{1,2}^2 + (\tilde{c}_{1,1} - \tilde{c}_{2,2})^2}} \qquad \text{Equation 8}$$

Thus, the two intersection points of the EWA ellipse and the ideal low-pass filter may be given by $p_1 = (1,\alpha)^T$ and $p_2 = (-\alpha,1)^T$, where $|\alpha| < 1$, or $p_1 = (\alpha^{-1},1)^T$ and $p_2 = (1,-\alpha^{-1})^T$ otherwise. Aliasing may occur where the value of the Gaussian filter at the intersection with an ideal low-pass filter is larger than the value of the optimal Gaussian kernel. The condition for aliasing may thus be given by the following equation:

$$\exp(-\tfrac{1}{2} p_l^T \tilde{C} p_l) > \exp(-\tfrac{1}{2} \hat{\sigma}_i^2), l=1,2 \qquad \text{Equation 9}$$

If the aliasing condition of Equation 9 holds, then the interpolation kernel may be convolved with an anti-aliasing kernel to remove the aliasing. As previously described, this convolution leads to an addition of the covariance matrices $C = \tilde{C} + V_a$. The anti-aliasing variance matrix can therefore be determined by substituting $\tilde{C}$ with C and by solving for the upper bound of the inequality of Equation 9, resulting in the following equation:

$$\exp(-\tfrac{1}{2} p_l^T (\tilde{C} + V_a) p_l) = \exp(-\tfrac{1}{2} \hat{\sigma}_i^2), l=1,2$$

$$p_l^T V_a p_l > \hat{\sigma}_i^2 - p_l^T \tilde{C} p_l, l=1,2 \qquad \text{Equation 10}$$

Combining Equation 10 above with the condition for aliasing (Equation 9) yields the following equation:

$$\begin{pmatrix} p_{1,1}^2 & p_{1,2}^2 \\ p_{2,1}^2 & p_{2,2}^2 \end{pmatrix} \begin{pmatrix} \sigma_{a,x}^2 \\ \sigma_{a,y}^2 \end{pmatrix} = \begin{pmatrix} \max(0, \tilde{\sigma}_i^2 - p_1^T \check{C} p_1) \\ \max(0, \tilde{\sigma}_i^2 - p_2^T \check{C} p_2) \end{pmatrix} \quad \text{Equation 11}$$

where $p_i=(p_{1,i},p_{2,i})^T$, and $V_a=\text{diag}(\sigma_{a,x}^2,\sigma_{a,y}^2)$ represents the anti-aliasing covariance matrix. Solving the Equation 11 for $\sigma_{a,x}^2$ and $\sigma_{a,y}^2$ provides an optimal choice for the EWA anti-aliasing filter in target space, according to one embodiment.

For many video rendering applications, the image transformation $J_k$ includes only non-uniform scaling with little or no shearing or rotation. In such cases, Equation 11 need not be solved for arbitrarily transformed covariance matrices, and, accordingly, Equation 11 may be further simplified. More specifically, Equation 11 may be simplified since the off-diagonal elements of the matrix $\check{C}$ are negligible compared to the diagonal elements. In some embodiments, the locally affine transformations of certain video retargeting applications may indicate that the off-diagonal elements of are $\check{C}$ several orders of magnitude smaller than the diagonal elements, such that $\check{c}_{i,j}/\check{c}_{i,i} \approx 10^{-3}$. Thus, $\check{C}$ may be treated as a diagonal matrix, where the off-diagonal components are ignored, and the main directions of the ellipse are given by the principal axes $p_1=(1,0)^T$ and $p_2=(0,1)^T$. The condition to detect aliasing given by Equation 11 may then be further simplified to the following equation:

$$\sigma_{a,x}^2 = \max(0, \tilde{\sigma}_i^2 - \check{c}_{1,1}) + \check{c}_{1,1}$$

$$c_{1,1} \equiv \check{c}_{1,1} + \sigma_{a,x}^2 = \max(\check{c}_{1,1}, \tilde{\sigma}_i^2) \quad \text{Equation 12}$$

A similar process may be used to reduce complexity of detecting aliasing in the y direction.

Bounding Box Determination

Figure 3:
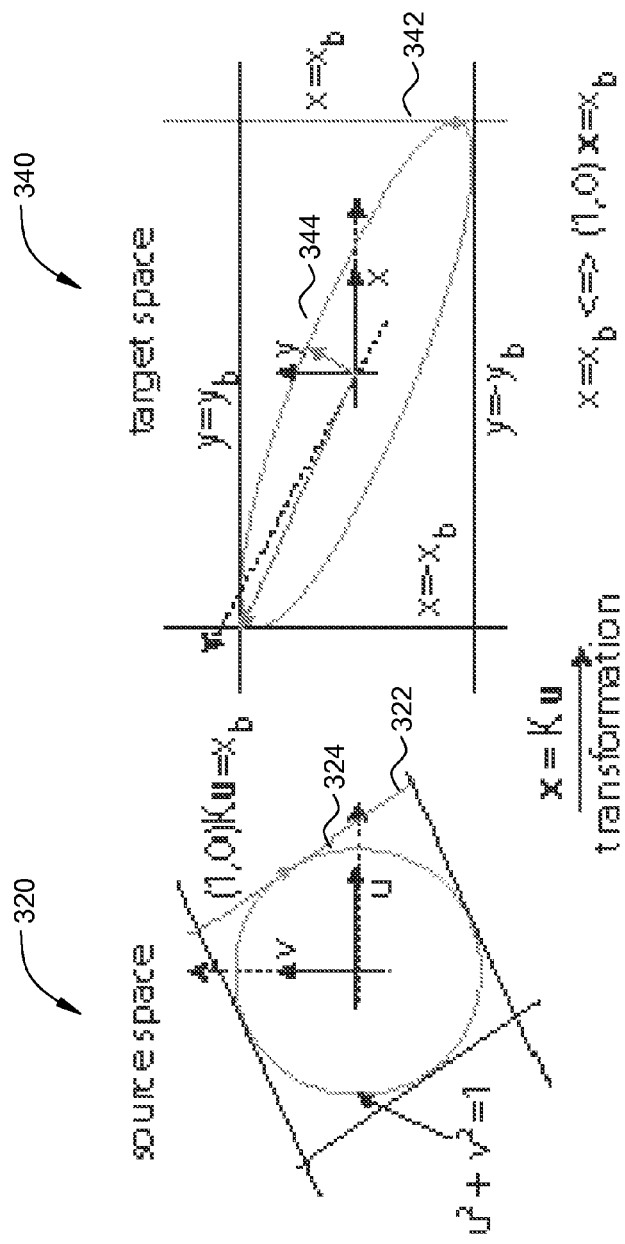
FIG. 3 illustrates the determination of a bounding box to apply to a Gaussian filter, according to one embodiment of the invention.

FIG. 3 illustrates the determination of a bounding box to apply to a Gaussian filter, according to one embodiment of the invention. As shown, a target space bounding box 342 is determined with respect to intersection points with a specific ellipse 344 in target space 340. As further described below, bounding box calculations may be simplified by transforming the intersection points to source space 320, where the ellipse 344 simplifies to a circle 324 within a source space bounding box 322.

Although the contributions of the Gaussian filter are ideally calculated over the entire image domain, the Gaussian weights decay rapidly from the central point of the filter. In one embodiment, Gaussian weights below a given threshold value may be discarded without appreciable image artifacts. In such cases, a bounding box may be applied to a Gaussian filter at this given threshold value where the Gaussian weights within the bounding box are considered while Gaussian weights falling outside of the bounding box are discarded. The computational performance needed to apply the Gaussian filter to the image is accordingly reduced. An axis-aligned bounding box may be derived that encloses the region of Gaussian weights that exceed the given threshold value. Evaluation of the Gaussian filter is then limited to the region within the bounding box.

In one embodiment, the given threshold defining the cut-off point for the bounding box may set to a Gaussian weight proportional to $\exp(-0.5)$. The EWA splatting equation (Equation 1) defines the implicit evaluation as $-0.5x^T (J_k V_i J_k^T + V_a)^{-1} x$, where the translational component may be omitted without loss of generality. This quadratic form does not directly reveal the explicit point transformation $x=Ku$, which may be used to determine the desired bounding box. Therefore, C is decomposed as follows $C=J_k V_i J_k^T + V_a = KK^T$, in order to obtain the transformation K. Since $V_i$ and $V_a$ are diagonal matrices, C is symmetric and can be diagonalized into an orthonormal basis, according to the following equation:

$$C = Q \Lambda Q^T = KK^T \quad \text{Equation 13}$$

where Q is orthogonal, and $\Lambda$ is diagonal. As a result, $K=Q\sqrt{\Lambda}$ is uniquely obtained with the Eigen decomposition.

Having obtained the explicit point transformation K, the bounding box delimiters, as illustrated in FIG. 3, may be determined. The target space bounding box 342 is delimited by four straight lines, $x=\pm x_b$ and $y=\pm y_b$, where $x=(x,y)^T$ is a point in target space 340. In one example, where $x=x_b$ could be rewritten in the form of $(1,0)x=x_b$. In such a case, transforming the target coordinates back into source space would yield the following equation:

$$(1,0)Ku = x_b$$

$$k_{1,1} u + k_{1,2} v = x_b \quad \text{Equation 14}$$

where $u=(u,v)^T$. Equation 14 defines a linear equation in source space 320 with normal vector $(1, -k_{1,1}/k_{1,2})^T$.

In source space 320, the EWA filter kernel resembles the unit circle. In one embodiment, an optimal bounding box line may be tangent to the unit circle, because affine transformations conserve lines and intersections, as indicated by the equations below:

$$u=(u,v)^T \quad \text{Equation 15}$$

$$(1, -k_{1,1}/k_{1,2})^T \quad \text{Equation 16}$$

where equation 16 is the condition for tangency. Combining equations 14, 15, and 16 yields the following equation:

$$x_b = \pm \sqrt{k_{1,1}^2 + k_{1,2}^2} \quad \text{Equation 17}$$

In addition, where $$C = KK^T = \begin{pmatrix} k_{1,1}^2 + k_{1,2}^2 & \cdot \\ \cdot & k_{2,1}^2 + k_{2,2}^2 \end{pmatrix}$$

(See Equation 13 and surrounding text), the bounding box simplifies to the following equations:

$$x_b = \pm \sqrt{c_{1,1}} \quad \text{Equation 18}$$

$$y_b = \pm \sqrt{c_{2,2}} \quad \text{Equation 19}$$

where Equation 19 follows from applying the above bounding box calculations for $y_b$.

The bounding box rectangle then delimits the ellipse to a cut-off value of $\exp(-0.5)$, since the rectangle delimits the unit circle in source space. For cut-off values other than $\exp(-0.5)$, the bounding box values may be scaled by $s_{bb}$ such that $s_{bb} x_b$ and $s_{bb} y_b$ generate the desired cut-off values.

EWA Rendering System

The techniques described above are efficiently implemented in a hardware architecture identified as a EWA rendering system. Although the calculations for EWA rendering are described above as being performed for each target pixel in the output image, the EWA rendering system reverses the flow such that contributions of each source pixel are accumulated into the various target pixels in the output image that are affected by a given source pixel in the input image. Accumulation is the process of combining intermediate results, intermediate result being the contribution of one mapped source pixel to one target pixel. This approach accommodates an image source that streams video one source pixel at a time. This approach also facilitates computations related to the bounding box. As originally described above, identifying the subset of source pixels with relevant contributions to a pixel in the target image may be complex, depending on the specific transformation from source space to target space. As implemented in hardware, the number of contributions of each source pixel can be more easily limited by the bounding box. After accumulating the contributions of each source pixel of the input image into the corresponding target pixels of the output image, a post-normalization function is performed to correct any truncation errors due to the bounding box and to accommodate the fact that a Gaussian filter is not a real interpolation filter. The pseudo-code presented in Table 1 below summarizes the main steps performed by the EWA splitting system, according to one embodiment:

TABLE 1

$k = 1 \ldots W_s H_s$, source image index
$h = 1 \ldots W_t H_t$, target image index
Input: pixel intensity $w_k$, Jacobian $J_k$, target position $m(u_k)$, default
variances $V_i = \sigma_i^2 I_2$, $V_a = \sigma_a^2 I_2$
Output: EWA splatted image $\tilde{f}_{EWA}(x_h)$
// For each pixel in source space, calculate contribution to pixels in target space //
for $k \in W_s H_s$ do
    Calculate $\tilde{C} = (J_k V_i J_k^T)$
    if adaptive then
        Determine $V_a$
    end
    Calculate $C^{-1} = (\tilde{C} + V_a)^{-1}$
    Calculate $c_k = 1/(2\pi) |J_k|\sqrt{|C^{-1}|}$
    Calculate bounding box: $\sqrt{c_{1,1}}, \sqrt{c_{2,2}}$
    for $x_h$ in bounding box do
        $\phi = c_k \cdot \exp(-\frac{1}{2}(x_h - m(u_k))^T C^{-1}(x_h - m(u_k)))$
        $\rho_h \leftarrow \rho_h + \phi$
        $\tilde{f}_{EWA}(x_h) \leftarrow \tilde{f}_{EWA}(x_h) + \phi \cdot w_k$
    end
end
// Normalize each pixel in target space //
for $h \in W_t H_t$ do
    Normalize $f_{EWA}(x_h) = \tilde{f}_{EWA}(x_h)/\rho_h$
end The process presented in Table 1 is further described below in the context of an implementation of the EWA rendering system, according to one embodiment.

Figure 4:
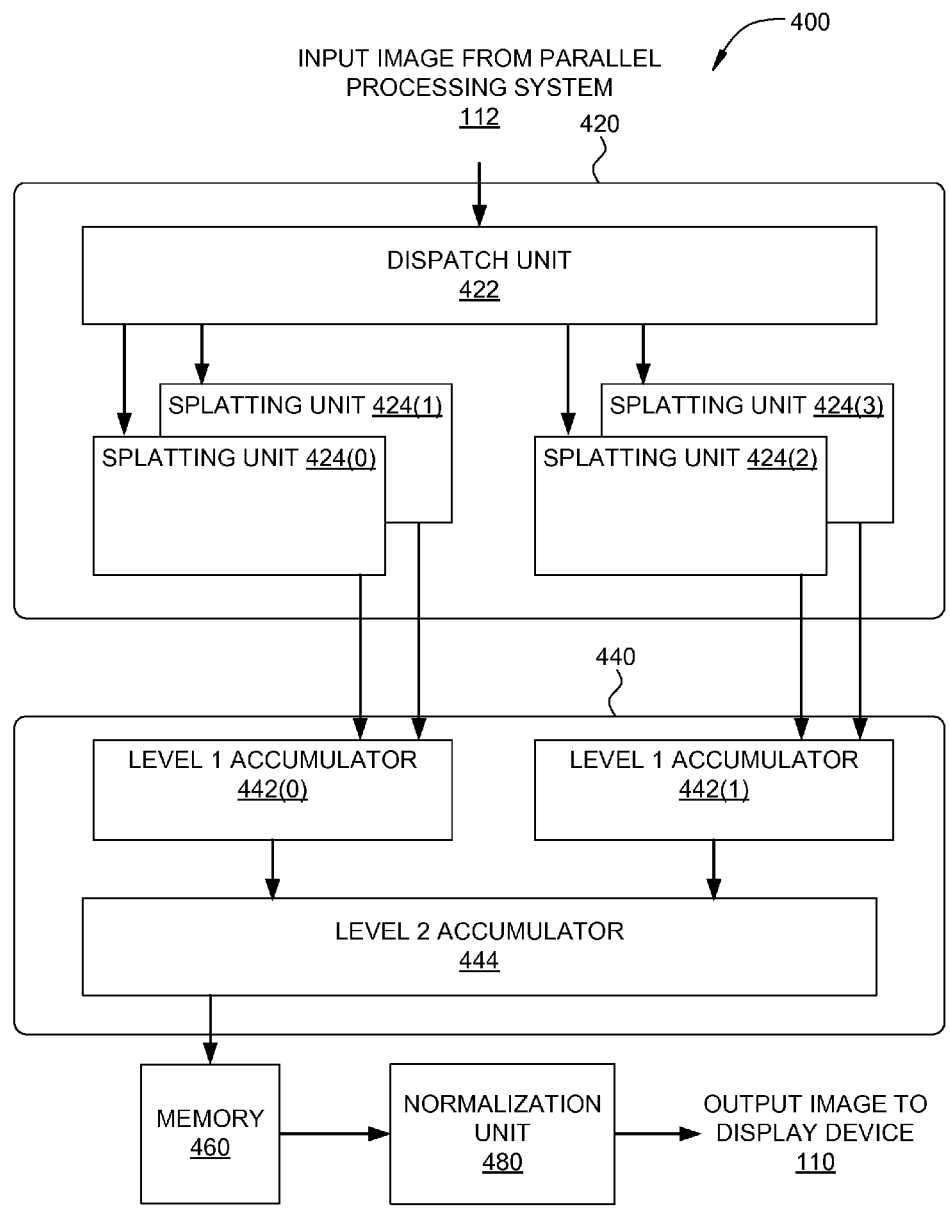
FIG. 4 illustrates an EWA rendering system as implemented within the display processor of FIG. 1, according to one embodiment of the present invention.

FIG. 4 illustrates a EWA rendering system 400 as implemented within the display processor 112 of FIG. 1, according to one embodiment of the present invention. As shown, the EWA rendering system 400 includes an arithmetic unit 420, an accumulation unit 440, a memory 460, and a normalization unit 480.

The arithmetic unit 420 calculates the contributions of each source pixel in the input image to one or more target pixels in the output image, and sends the contributions to the accumulation unit 440. As shown, the arithmetic unit 420 includes a dispatch unit 422 and one or more splatting units 424.

The dispatch unit 422 receives source Jacobian and pixel values from the input image and distributes these values to one or more splatting units 424. The dispatch unit 422 may distribute the Jacobian and pixel values using any technically feasible approach, including, without limitation, a round-robin, a first-available, or a priority approach. In some embodiments, multiple dispatch units 422 may receive Jacobian and pixel values from the input image, each dispatch unit 422 distributing these values to one or more splatting units 424.

As further described below in conjunction with FIG. 5, the splatting units 424 receives the Jacobian and pixel values from the dispatch unit 422, and generates the contributions of each source pixel to one or more target pixels. The resulting contributions are then sent to the accumulation unit 440.

The accumulation unit 440 receives filtered and rasterized pixels from the arithmetic unit 420. The accumulation unit 440 accumulates contributions from a particular source pixel in the input image to one or more target pixels in the output image. The accumulation unit 440 composites the contributions with the existing target pixel data stored in the memory 460, typically using a read-modify-write operation.

Because a single source pixel in the input image may affect multiple target pixels in the output image, the accumulation unit 440 may be designed to manage output data from the arithmetic unit 420 so as to reduce the needed bandwidth to the memory 460. In addition, because the accumulated source pixel contributions may be distributed to the various target pixels in an arbitrary manner, the accumulation unit 440 may access the memory 460 in a random pattern, as compared to the regular pattern associated with the input image.

In order to reduce the bandwidth and random-access pattern to the memory 460, the accumulation unit 440 may be realized in multiple stages. Characteristics of typical access patterns may be exploited to reduce bandwidth to the memory 460. The rectangular bounding boxes described above access the memory 460 in blocks of neighboring pixels. Because source pixels are streamed into the EWA rendering system 400 in scanline order, corresponding target pixels are typically horizontally neighboring pixels in the memory 460. This access pattern also holds for vertically neighboring pixels. As such, the accumulation unit 440 may benefit from accumulating source pixel contributions to a 2D set of neighboring target pixels using an accumulation cache (not shown) associated with the accumulation unit 440. The contents of the accumulation cache may then be efficiently written as a block to the memory 460. In addition, because the arithmetic process associated with accumulation is both an associative and commutative operation, the accumulation unit 440 is separable into multiple partial accumulations, such as the level 1 accumulators 442 and the level 2 accumulator 444 as shown in FIG. 4. In some embodiments, any number of level 1 accumulators 442 and level 2 accumulators 444 may be present in the accumulation unit 440 within the scope of the present invention. In some embodiments, the accumulation unit may have only one level of accumulators, or may have more than two levels of accumulators, within the scope of the present invention.

Accumulation unit 440 performance may be further increased by taking advantage of the characteristics of non-linear warping, where horizontal lines in the source image may be rendered as arbitrarily-shaped curves in the target space. Therefore, when processing a horizontal line in source space, the above-mentioned accumulation cache may include a group of 2D blocks of memory, where each block represents a vertical set of horizontal lines in target space, and where each 2D block is individually addressable. In this manner, a horizontal line in source space may be rendered into such a 2D block within the accumulation unit 440. The 2D block may then be written efficiently to memory 460.

Accumulation unit 440 performance may be further increased by utilizing a multi-level cache, where a large accumulation cache within the accumulation unit 440 using a slower memory, may be supported by smaller and faster accumulation buffers local to the level 1 accumulators 442 and the level 2 accumulator 444, as is known in the art. In some embodiments, any number of layers of accumulation caches may be present in the accumulation unit 440 within the scope of the present invention.

In one example, a first level accumulation cache associated with the level 1 accumulators 442 includes 2D blocks for storing horizontally and vertically neighboring and overlapping pixels received from the rasterizers of the splatting units 424. The resulting 2D blocks are accumulated into a larger second level 2D accumulation cache associated with the level 2 accumulator 444, where the second level 2D accumulation cache may span more vertical lines than the 2D blocks within the first level accumulation cache. The contents of the second level 2D accumulation cache may then be written to memory 460. In one embodiment, the accumulation caches may be sized such that contributions for a given portion of the output image may be computed in a single pass, resulting in a simple write from the second level accumulation cache to the memory 460, rather than an accumulation to memory 460 using read-modify-write operations. As is known in the art, the number of accumulation cache levels, the size of the caches, and the cache type (e.g. 2-way set-associative, direct-mapped, etc.) may be optimally determined based on various factors, including, without limitation, the resolution of the input image, the frame rate, and the specific EWA rendering application.

The memory 460 receives accumulated pixel data from the accumulation unit, and stores the pixel data until EWA rendering is complete for the current input image, and the resulting output image is available for display. In some embodiments, the memory may be double-buffered so that one buffer is available for accumulating pixel data for a current input image, while the other buffer is available for sending a previously rendered image for normalization and display.

The normalization unit 480 receives the final EWA rendered from the memory 460. The normalization unit 480 performs a normalization on the accumulated pixel data in the memory 460 to correct any truncation errors due to the bounding box and to accommodate the fact that a Gaussian filter is not a real interpolation filter. The normalization unit then send the normalized output pixels to the display device 110.

Figure 5:
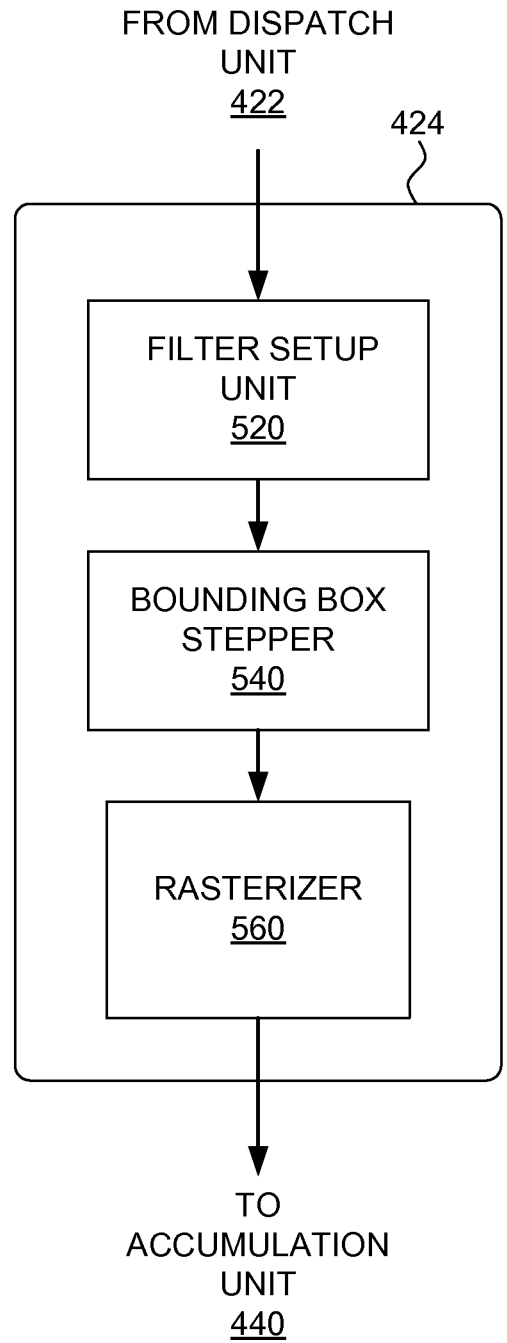
FIG. 5 illustrates an EWA splatting unit as implemented within the EWA rendering system of FIG. 4, according to one embodiment of the present invention.

FIG. 5 illustrates an EWA splatting unit 424 as implemented within the EWA rendering system 400 of FIG. 4, according to one embodiment of the present invention. As shown, the EWA splatting unit 424 includes a filter setup unit 520, a bounding box stepper 540, and a rasterizer 560.

The filter setup unit 520 receives Jacobian and pixel values from the dispatch unit 422, and generates the generates the covariance matrix, the determinants, and the bounding box, as previously described. The filter setup unit computes the contributions of each source pixel to corresponding target pixels and sends the contributions to the bounding box stepper 540. The filter setup unit 520 sends the resulting contributions to the bounding box stepper 540.

The bounding box stepper 540 receives target pixel contributions from the 520 and applies a bounding box to each of the contributions, as previously described. The bounding box defines region surrounding a given portion of target space where the weights of the Gaussian filter exceed a specified threshold value. The Gaussian filter is not applied outside the bounding box region, resulting in a reduction of computational complexity and improved performance. The output of the bounding box stepper 540 is sent to the rasterizer 560.

The rasterizer 560 maps the pixel contributions, truncated by the bounding box stepper 540, to the target space of the output image. Once the contributions are mapped to the target space, the rasterizer 560 sends the mapped contributions to the accumulation unit 440 for further processing.

In one embodiment, the data path of the splatting unit 424 may implement various linear matrix operations and non-linear functions. Two multiply-accumulate (MAC) units (not shown) may be used to calculate the covariance matrix C and the associated determinants $|J_k|$ and $|C|$, respectively. The adaptive anti-aliasing filters, reduced to a thresholding operation as previously discussed, may be implemented as a comparator. The normalization factor $1/\sqrt{|C|}$ of the Gaussian filter may be efficiently implemented using a fast inverse square root algorithm, using multiplications and additions, as is known in the art. Similarly, the square root operations associated with the bounding box calculation $\sqrt{c_{i,i}}$ may be approximated with a fast inverse square root $z \cdot 1/\sqrt{z}$. The bounding box may be rounded to an integer grid, with sufficient accuracy for generating an output image of acceptable quality. The 2-by-2 matrix inversion of the covariance matrix C may be realized by multiplying the entries of C with $1/|C|$, and inverting the sign of the off-diagonal elements. The inversion may be realized with a look-up table (LUT) followed by four refining Newton iterations, as given by the equation below:

$$z_{n+1} = 2 \cdot z_n - z_n^2 \cdot a, n=0, \ldots, 3 \qquad \text{Equation 20}$$

where a is the value to be inverted, $z_n$ is the result after n iterations, and $z_0$ is the initial LUT value. The sampling points of the values in the LUT may be logarithmically spaced over the function domain to increase precision. The (base-2) logarithmic look-up may be obtained by counting the number of leading zeros of the input value. A third MAC unit (not shown) may be used to realize the multiplication of $c_{i,j}$ by $1/|C|$, the bounding box scaling $s_{bb}\sqrt{c_{i,i}}$, and the multiplication of the normalization factors $1/(2\pi)|J_k||C|^{-0.5}$. The exponential function of the rasterizer 560 may be realized with linear interpolation between uniformly spaced pre-calculated supporting points.

As is known in the art, various floating-point and fixed-point formats, at various precision levels, may be used for performing the calculations in the splatting unit 424. In one embodiment, the specific format and precision level may be determined based on the desired level of accuracy versus computational complexity.

In one embodiment, any one or more of the filter setup unit 520, the bounding box stepper 540, and the rasterizer 560 may be pipelined to increase throughput with a corresponding increase in latency.

Figure 6:
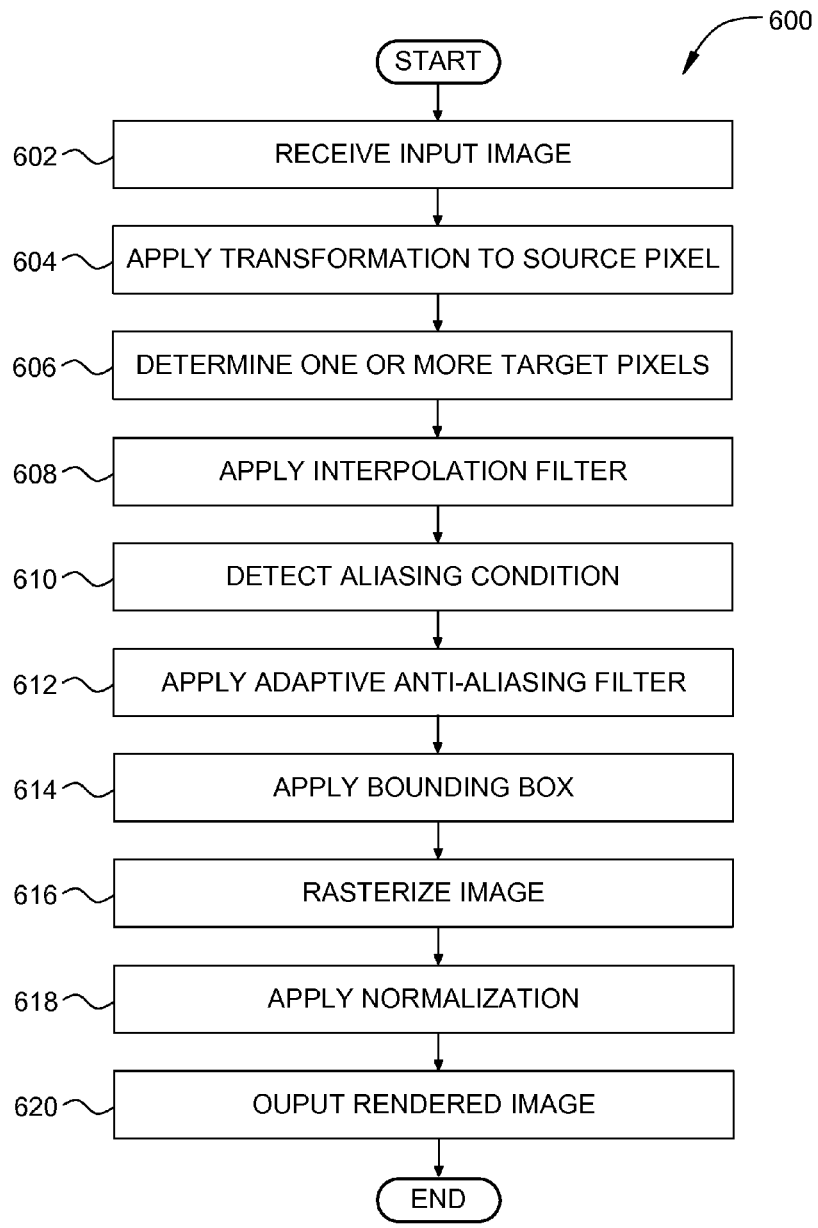
FIG. 6 illustrates a method for rendering images using EWA splatting, according to one embodiment of the present invention.

FIG. 6 illustrates a method 600 for rendering images using EWA splatting, according to one embodiment of the present invention. Although the method steps are described in conjunction with FIGS. 1-5, persons skilled in the art will understand that any system configured to perform the method steps, in any order, falls within the scope of the present invention.

The method 600 begins at step 602, where the EWA rendering system 400 receives an input image associated with a source space from the parallel processing system 112, where the input image includes a plurality of source pixels. At step 604, the EWA rendering system 400 applies a transformation to a source pixel that maps the source pixel to a target space associated with an output image, where the output image includes a plurality of target pixels. At step 606, the EWA rendering system 400 determines at least one target pixel that is affected by the source pixel based on the transformation. At step 608, the EWA rendering system 400 applies an interpolation filter to a pixel of the input image. At step 610, the EWA rendering system 400 detects whether a condition exists that will result in aliasing. In some embodiments, the EWA rendering system 400 may detect that such an aliasing condition exists by computing a difference value between the transformed source pixel and a threshold value associated with an aliasing condition, and setting one or more parameters related to an anti-aliasing filter based on the difference.

At step 612, the EWA rendering system 400 applies an adaptive anti-aliasing filter to a pixel of the input image based on whether an aliasing condition exists, and based on the amount of aliasing. In an embodiment, the anti-aliasing filter may include a Gaussian filter. In one embodiment, the EWA rendering system 400 may apply the anti-aliasing filter by calculating a Jacobian matrix associated with the input image, based on the transformation, calculating a covariance matrix based on the source pixel, calculating a Jacobian determinant based on the Jacobian matrix, and calculating a covariance determinant based on the covariance matrix. In a further embodiment, at least one multiply-accumulate unit may be used in making at least one of these four calculations. In some embodiments, the EWA rendering system 400 may convolve the anti-aliasing filter with the interpolation filter. At step 614, in some embodiments, the EWA rendering system 400 may apply a bounding box to a pixel of the input image. The bounding box may circumscribe a region in the target space where one or more filter weights of the anti-aliasing filter exceed a threshold value. The EWA rendering system 400 may apply the bounding box by evaluating the anti-aliasing filter to the transformed source pixel over the region circumscribed by the bounding box.

At step 616, the EWA rendering system 400 rasterizes the pixel of the input image truncated by the bounding box. In some embodiments, the EWA rendering system 400 may write the transformed source pixel into a location in the output image associated with the target pixel. In some embodiments, writing the transformed source pixel may include accumulating the transformed source pixel with a value previously associated with the target pixel to create an accumulated value, and writing the accumulated value into the location in the output image associated with the target pixel. EWA rendering system 400 may accumulate the transformed source pixel by performing a first partial accumulation, where the result of the first partial accumulation is written to a first level accumulation buffer within a plurality of first level accumulation buffers, and performing a second partial accumulation based on the first partial accumulation, where the result of the second partial accumulation is written to a second level accumulation buffer that is configured to store the contents of the plurality of first level accumulation buffers.

At step 618, in some embodiments, the EWA rendering system 400 may apply a normalization function to a target pixel based on the accumulated value. At step 620, the EWA rendering system 400 sends the rendered and normalized image to a display device 112. The method 600 then terminates. As will be known, the steps of method 600 may be repeated for multiple pixels covering a portion of the input image or the entire input image, within the scope of the present invention.

In sum, techniques are disclosed for efficiently rendering visual content from a source format to a target format aspect with reduced blurring as compared to current EWA splatting techniques. EWA splatting is optimized by choosing certain filter parameters and utilizing an adaptive anti-aliasing technique that determines an optimal tradeoff between blurring and aliasing. Cut-off points for the infinite impulse response (IIR) filters used in EWA rendering are selected in the rendered target space, providing acceptable filter quality with greater computational efficiency relative to ideal IIR filters. A hardware architecture is configured for real-time non-linear EWA rendering of high-resolution images with lower cost, lower power, and smaller integrated circuit size relative to prior techniques. A two-level accumulating caching architecture reduces memory bandwidth usage relative to prior techniques.

Various embodiments of the invention may be implemented as a program product for use with a computer system. The computer system may be any device suitable for practicing one or more embodiments of the present invention, including, without limitation, a personal computer, video game console, personal digital assistant, rendering engine, mobile device, or dedicated hardware platform, such as a very large scale integrated (VLSI) circuit, a field-programmable gate array (FPGA), or an application specific integrated circuit (ASIC). The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method to non-linearly warp an input image from a source aspect ratio to a target aspect ratio, the computer-implemented method comprising:
    receiving an input image associated with a source space having the source aspect ratio, the input image comprising a plurality of source pixels;
    applying an adaptive transformation to a source pixel within the plurality of source pixels and by operation of one or more computer processors, the adaptive transformation mapping the source pixel to a target space associated with an output image comprising a plurality of target pixels, the target space having the target aspect ratio, which is different from the source aspect ratio, wherein applying the adaptive transformation comprises determining filter parameters based on trading off blurring and aliasing, including calculating one or more determinants based on one or more matrices associated with each source pixel, where the one or more matrices include at least one of a Jacobian matrix and a covariance matrix;
    determining a target pixel, of the plurality of target pixels, that is affected by the source pixel based on the adaptive transformation; and
    writing the transformed source pixel into a location in the output image associated with the target pixel, wherein the output image is generated based on the input image and to the exclusion of any other input image.

2. The computer-implemented method of claim 1, wherein the adaptive transformation is determined by calculating an optimal interpolation filter in the target space.

3. The computer-implemented method of claim 2, further comprising convolving the optimal interpolation filter with an anti-aliasing filter resulting in the adaptive transformation, wherein the adaptive transformation satisfies an aliasing condition.

4. The computer-implemented method of claim 3, wherein the anti-aliasing filter is applied only upon determining that the adaptive transformation satisfies the aliasing condition, wherein the anti-aliasing filter is determined by
computing a difference value between the optimal interpolation filter and a threshold value associated with the aliasing condition; and
setting one or more parameters related to the anti-aliasing filter based on the difference value.

5. The computer-implemented method of claim 1, wherein determining a target pixel, of the plurality of target pixels, further comprises determining a bounding box circumscribing a region in the target space where one or more filter weights of the adaptive transformation exceed a threshold value.

6. The computer-implemented method of claim 1, wherein writing the transformed source pixel comprises:
accumulating the transformed source pixel with a value previously associated with the target pixel to create an accumulated value; and
writing the accumulated value into the location in the output image associated with the target pixel.

7. The computer-implemented method of claim 6, wherein accumulating the transformed source pixel comprises:
performing a first partial accumulation, wherein the result of the first partial accumulation is written to a first level accumulation buffer within a plurality of first level accumulation buffers; and
performing a second partial accumulation based on the first partial accumulation, wherein the result of the second partial accumulation is written to a second level accumulation buffer that is configured to store the contents of the plurality of first level accumulation buffers.

8. The computer-implemented method of claim 6, further comprising normalizing the target pixel based on the accumulated value.

9. The computer-implemented method of claim 1, wherein the adaptive transformation comprises a Gaussian filter.

10. A non-transitory computer-readable medium including instructions executable to perform an operation to warp an input image, the operation comprising:
receiving an input image associated with a source space having the source aspect ratio, the input image comprising a plurality of source pixels;
applying an adaptive transformation to a source pixel within the plurality of source pixels and by operation of one or more computer processors when executing the instructions, the adaptive transformation mapping the source pixel to a target space associated with an output image comprising a plurality of target pixels, the target space having the target aspect ratio, which is different from the source aspect ratio, wherein applying the adaptive transformation comprises determining filter parameters based on trading off blurring and aliasing, including calculating one or more determinants based on one or more matrices associated with each source pixel, where the one or more matrices include at least one of a Jacobian matrix and a covariance matrix;
determining a target pixel, of the plurality of target pixels, that is affected by the source pixel based on the adaptive transformation; and
writing the transformed source pixel into a location in the output image associated with the target pixel, wherein the output image is generated based on the input image and to the exclusion of any other input image.

11. The non-transitory computer-readable medium of claim 10, wherein the adaptive transformation is determined by calculating an optimal interpolation filter in the target space.

12. The non-transitory computer-readable medium of claim 11, wherein the operation further comprises:
convolving the optimal interpolation filter with an anti-aliasing filter resulting in the adaptive transformation, wherein the adaptive transformation satisfies an aliasing condition.

13. The non-transitory computer-readable medium of 12, wherein the anti-aliasing filter is determined by:
computing a difference value between the optimal interpolation filter and a threshold value associated with the aliasing condition; and
setting one or more parameters related to the anti-aliasing filter based on the difference value.

14. The non-transitory computer-readable medium of claim 10, wherein determining a target pixel, of the plurality of target pixels, further comprises determining a bounding box circumscribing a region in the target space where one or more filter weights of the adaptive transformation exceed a threshold value.

15. the non-transitory computer-readable medium of claim 10, wherein writing the transformed source pixel comprises:
accumulating the transformed source pixel with a value previously associated with the target pixel to create an accumulated value; and
writing the accumulated value into the location in the output image associated with the target pixel.

16. A computing system to non-linearly warp an input image from a source aspect ratio to a target aspect ratio, the computing system comprising:
a memory configured to store instructions for a program; and
one or more computer processors configured to execute the instructions for the program to perform an operation comprising:
receiving an input image associated with a source space having the source aspect ratio, the input image comprising a plurality of source pixels;
applying an adaptive transformation to a source pixel within the plurality of source pixels, the adaptive transformation mapping the source pixel to a target space associated with an output image comprising a plurality of target pixels, the target space having the target aspect ratio, which is different from the source aspect ratio, wherein applying the adaptive transformation comprises determining filter parameters based on trading off blurring and aliasing, including calculating one or more determinants based on one or more matrices associated with each source pixel, where the one or more matrices include at least one of a Jacobian matrix and a covariance matrix;
determining a target pixel, of the plurality of target pixels, that is affected by the source pixel based on the adaptive transformation; and
writing the transformed source pixel into a location in the output image associated with the target pixel, wherein the output image is generated based on the input image and to the exclusion of any other input image.

17. The non-transitory computer-readable medium of claim 10, wherein the adaptive transformation comprises a Gaussian filter.

18. The system of claim 16, wherein the adaptive transformation is determined by calculating an optimal interpolation filter in the target space.

19. The system of claim 16, wherein the adaptive transformation comprises a Gaussian filter.

20. The system of claim 16, wherein at least one multiply accumulate unit is used in at least one of matrix calculation and determinant calculation.

* * * * *

UNITED STATES PATENT AND TRADEMARK OFFICE
CERTIFICATE OF CORRECTION

PATENT NO. : 9,215,440 B2
APPLICATION NO. : 13/654350
DATED : December 15, 2015
INVENTOR(S) : Greisen et al.

It is certified that error appears in the above-identified patent and that said Letters Patent is hereby corrected as shown below:

Title Page, (73) Assignee:

Please delete "Disney Enterprises, Inc., Burbank, CA (US)" and insert -- Disney Enterprises, Inc., Burbank, CA (US); ETH Zurich (Eidgenoessische Technische Hochschule Zurich), Zurich (CH) -- therefor;

In the Specification:

Column 4, Line 54, please delete "110" and insert -- I/O -- therefor;

Column 6, Line 46, please delete "$V_i = \sigma_i^2 I_2$," and insert -- $V_i = \sigma_i^2 I_2$, -- therefor;

Column 6, Line 46, please delete "$\sigma_i^2$" and insert -- $\sigma_i^2$ -- therefor;

Column 7, Line 13, please delete "splitting" and insert -- splatting -- therefor;

Column 7, Line 17, please delete "off" and insert -- of -- therefor;

Column 9, Lines 28-31, please delete $$\sigma_{a,x}^2 = \max(0, \tilde{\sigma}_i^2 - \tilde{c}_{1,1}) | + \tilde{c}_{1,1}$$
$$c_{1,1} \equiv \tilde{c}_{1,1} + \sigma_{a,x}^2 = \max(\tilde{c}_{1,1}, \tilde{\sigma}_i^2),$$

and insert --
$$\sigma_{a,x}^2 = \max(0, \tilde{\sigma}_i^2 - \tilde{c}_{1,1}) \; | + \tilde{c}_{1,1}$$
$$c_{1,1} \equiv \tilde{c}_{1,1} + \sigma_{a,x}^2 = \max(\tilde{c}_{1,1}, \tilde{\sigma}_i^2)$$
-- therefor;

Signed and Sealed this
Sixteenth Day of August, 2016

Michelle K. Lee
*Director of the United States Patent and Trademark Office*

CERTIFICATE OF CORRECTION (continued)

U.S. Pat. No. 9,215,440 B2

Column 10, Line 37, please delete "$x_b = \pm \sqrt{k_{1,1}^2 + k_{1,2}^2}$" and insert -- $x_b = \pm \sqrt{k_{1,1}^2 + k_{1,2}^2}$ -- therefor;

Column 11, Line 21, please delete "splitting" and insert -- splatting -- therefor;

Column 11, Line 31, please delete "Calculate $\tilde{C} = (J_k V_i J_k^T)$" and insert -- Calculate $\tilde{C} = (J_k V_i J_k^T)$ -- therefor;

Column 14, Line 24, please delete "$z_{n+1} = 2 \cdot z_n - z_n^2 \cdot a, n = 0, \ldots, 3$" and insert -- $z_{n+1} = 2 \cdot z_n - z_n^2 \cdot a, \quad n = 0, \ldots, 3$ -- therefor;

Column 14, Line 25, please delete "a" and insert -- α -- therefor;

In the Claims:

Column 18, Claim 15, Line 29, please delete "the" and insert -- The -- therefor.